Figure 1:
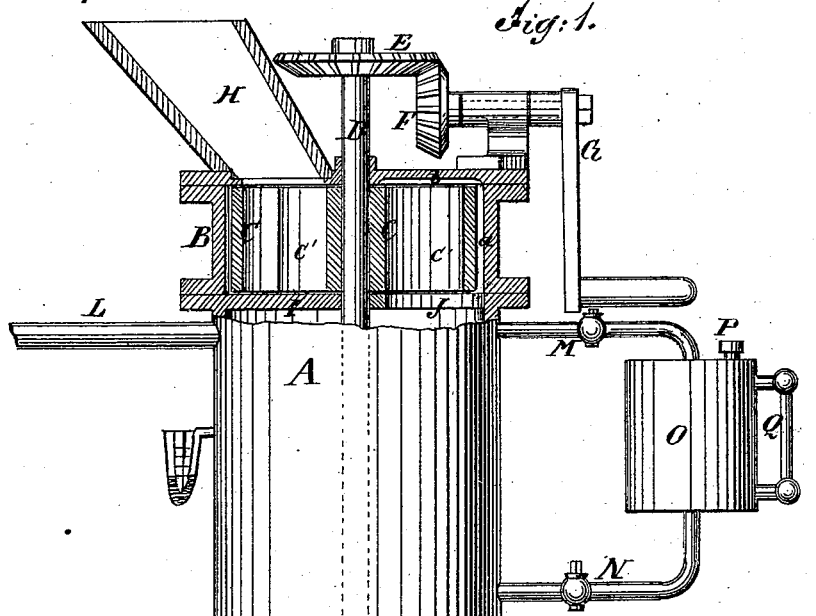

2 Sheets—Sheet 1.

C. H. THOMPSON.
CARBONIC ACID GAS GENERATOR.

No. 183,604.  Patented Oct. 24, 1876.

Witnesses:
Chas H Neilson
E. Depiquet

Inventor:
Charles H Thompson

2 Sheets—Sheet 2

C. H. THOMPSON.
CARBONIC ACID GAS GENERATOR.

No. 183,604. Patented Oct. 24, 1876.

Witnesses:
Chas. H. Neilson
C. Répiquet

Inventor:
Charles H. Thompson

N. PETERS, PHOTO-LITHOGRAPHER, WASHINGTON, D. C.

UNITED STATES PATENT OFFICE.

CHARLES H. THOMPSON, OF WATERBURY, CONNECTICUT.

IMPROVEMENT IN CARBONIC-ACID-GAS GENERATORS.

Specification forming part of Letters Patent No. 183,604, dated October 24, 1876; application filed July 3, 1875.

*To all whom it may concern:*

Be it known that I, CHARLES H. THOMPSON, of Waterbury, in the county of New Haven and State of Connecticut, have invented certain new and useful Improvements in the Continuous Generation of Carbonic-Acid Gas for Extinguishing Fires; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of this invention is to extinguish fire in mines or confined places, or on shipboard, without damage to the cargo; and the invention consists in apparatus for the generation of carbonic-acid gas, said apparatus being constructed, and arranged, and provided with suitable pipes, so that the gas may be instantly and continuously generated by one apparatus, and conducted at once, in uninterrupted supply, to any part of a ship, mine, or inclosed space, where its presence will instantly annihilate fire.

A difficulty heretofore experienced in apparatus for the generating of carbonic-acid gas for the extinguishing of fires has been that the carbonate, by being kept in the apparatus, suffers deterioration. It is liable to harden, cake, or become neutralized. In this state the admission of the acid would evolve gas so feebly and slowly that practically it would be inoperative.

In most apparatus the carbonate and the acid being contained therein, it is impossible to generate more than a certain amount of gas without taking the apparatus to pieces and renewing the supply of ingredients.

By my apparatus I am enabled to feed fresh carbonate and acid constantly, and to produce a continuous supply of carbonic-acid gas under great pressure, and for any length of time.

The carbonate employed may be marble-dust, chalk, or other form of calcium carbonate, and I may use hydrochloric, sulphuric, or other suitable acid. If hydrochloric acid is used, calcium chloride will be left behind in solution, whereas with sulphuric acid an insoluble sulphate will be left behind. The carbonate which I prefer to use, however, is bicarbonate of soda, and the acid commercial sulphuric acid. This leaves a solution of sulphate of soda, or Glauber's salt, in the vessel A, which can be readily drawn off. I do not limit myself to any definite formulæ; but, in practice, I use one carboy of sulphuric acid, containing one hundred and sixty-five pounds acid mixed with fifteen gallons of water for purpose of dilution, to one keg of Newcastle soda, containing one hundred and twelve pounds. The product will be six hundred and forty-four cubic feet of pure dry carbonic-acid gas. Ten per cent. of pure carbonic-acid gas in a confined state will suspend combustion; twenty per cent. will extinguish coals of fire, so that six hundred and forty-four cubic feet of gas would suspend combustion in six thousand four hundred and forty cubic feet of space.

Figure 3:
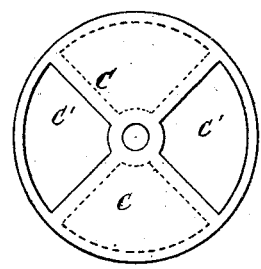
Figure 2:
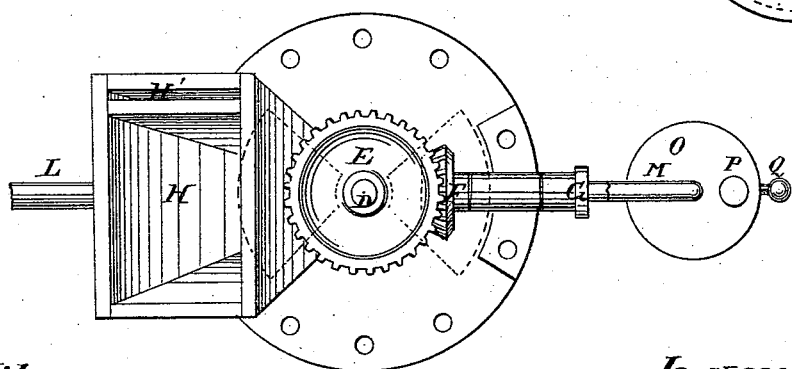
Figure 4:
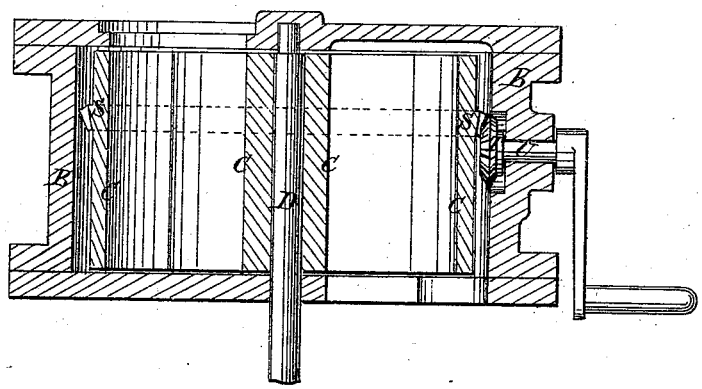
Figure 5:
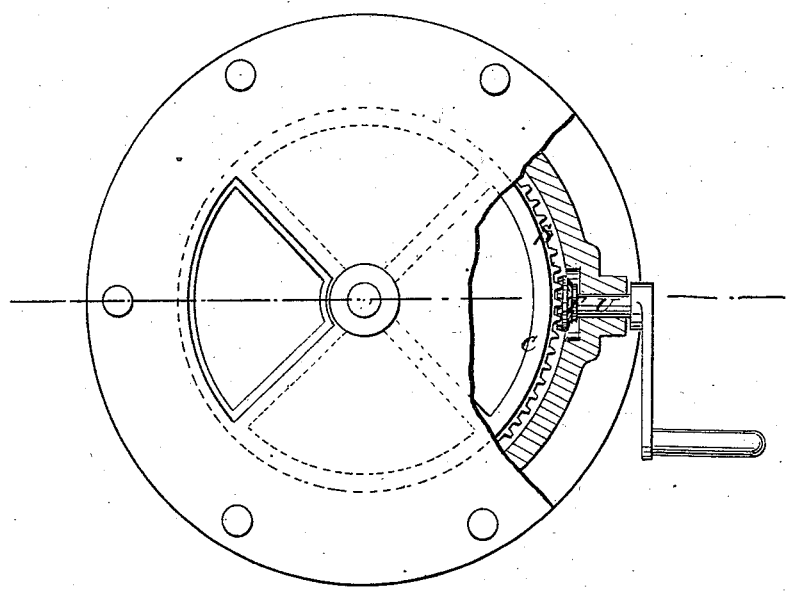

In the accompanying drawings, forming part of this specification, and in which like letters of reference indicate corresponding parts, Figure 1 is an elevation of my apparatus, but showing the feed-chute or hopper and the carbonate-compartments in section, and being broken away below to show the stirrer. Fig. 2 is a top view of the apparatus. Fig. 3 is a top view of the feed-compartments. Fig. 4 is a view in section of the feed-compartments, showing another method of revolving them. Fig. 5 is a top view of the apparatus under the modification shown in Fig. 4, and having the top plate broken away to show the gearing.

A strong metal case, capable of resisting great pressure, is divided into two chambers (a lower, A, and an upper one, B) by the diaphragm or partition I, having an opening, J. Within the chamber B, fixed to and revolving with the shaft D, is a wheel or feeding device. This wheel consists of a broad rim or periphery, of a breadth corresponding to the height of the chamber B, and has two or more compartments or boxes, C, which are closed at the top and open at the bottom. Between the boxes or inverted cups C are openings C', which extend the entire width of the wheel, and which, with the partition I and sides of the boxes C, form the feeding-chambers. The sides of the boxes C, forming the walls of the chambers C', may be at an angle with or inclined to the partition I, to serve as a plow, shovel, or scraper, and prevent any clogging of the feeding device. The upper side of the diaphragm I and the inside of the chamber B are of lead or copper, to form, with the top and bottom of the wheel in chamber B, a ground joint which will not be attacked by the ingredients or their resultant gas. It is obvious, however, that this wheel might be made to turn snug or flush with the top and bottom of its containing-chambers by means of suitable packing. $a$ and $b$ are passages for gas, to equalize the pressure upon the contents of the feeding-chambers. H is a feed-chute or hopper, having a partition, H'.

Within the chamber A, which is the gas-generating chamber proper, and attached to, and revolving with, the shaft D, is the stirrer K, covered with some argillaceous compound, so as not to be attacked by the acid. R is an outlet-pipe, to draw off spent or neutral liquor. L is the gas-outlet pipe. The case is provided with suitable gage-glass and pressure-gage.

The shaft D, to which are attached the feed-wheel in chamber B and the stirrer in chamber A, may be turned by the bevel-wheels E and F and hand-cranks G; or power may be applied directly to the rim of the wheel through cog-wheel S, geared suitably to a prime shaft, V, as shown in Figs. 4 and 5. It is obvious, also, that the feed-compartment's shaft D and stirrer may be revolved continuously or intermittently by machinery.

Outside the casing, and communicating with the same by means of pipes M, is the acid-chamber O, of suitable metal such as lead or other material, such as wood treated with asphalt, glycerine, or paraffine, or the like, to resist the action of the acid.

The pipe N, through which acid runs from the acid-chamber O into the chamber A, is provided with a suitable valve, to check or regulate the flow. The pipe M, communicating with the upper part of the chamber A, serves to equalize the pressure upon the acid in chamber O. P is a screw-cap, covering the inlet-opening for acid. Q is a gage-glass.

The operation of the device is as follows: Acid having been run into the chamber A, a package of fresh carbonate is broken and thrown into the hopper H, from which it falls into one of the chambers C'. As the wheel revolves, the alkali is carried over the opening J in the partition I, and falls into the chamber A, now containing acid. Gas is instantly generated. At the same time, the top or closed end of one of the boxes C closes the bottom of the hopper, and the side of the box next to the opening J prevents the gas rushing out through the hopper. The wheel continues to revolve. The alkali in the hopper, now resting on the closed end of one of the boxes C, falls into the next compartment C', while the open end of the box C comes over the opening J in the partition I.

As the feed-chamber C' passed from over the opening J it was, of course, full of gas, and this gas, it is obvious, would rush out through the hopper and scatter its contents about in an inconvenient manner as soon as the top of the box C, forming the bottom of the hopper for the time being, moved sufficiently around to make a slight opening from the chamber into the hopper. To obviate this I place in the hopper a partition, H', which cuts off a small portion of the hopper. Into this portion no alkali is placed; and as the feed-chamber opens into it first—that is to say, as the top of box C, forming the bottom of the entire hopper, moves from under this portion of the hopper first—the gas escapes through it and occasions no inconvenience. At each feed-chamber C' the rim of the wheel is constructed so as to leave a space between it and the sides of the chamber B. This space, which is shown at $a$, communicates with a storage-chamber or bulge in the top of the chamber B. The object of the passage $a$ and the bulge or storage-chamber, which is shown at $b$, is, that as each feed-chamber C' comes under it and over the opening J, the pressure of gas from the lower chamber may be sufficiently overcome to permit the contents to fall.

It will thus be seen that a continuous supply of fresh carbonate may be trapped into the chamber A without intermission in the operation of the apparatus, and without material loss of gas. The flow of acid will, of course, be regulated to correspond.

My apparatus may be placed in the engine-room or other convenient locality, having pipes leading from it provided with suitable valves to all parts of the ship or inclosed space, so that, at an instant's warning, the gas can be generated, and the whole of it directed to any desired locality or compartment.

Having thus fully described my invention, what I desire to claim, and secure by Letters Patent, is—

1. The process of generating dry carbonic-acid gas continuously, which consists in trapping uninterruptedly and quickly any desired quantity of dry carbonate from an independent source into a quantity of acid, supplied in quantity to conform to the supply of carbonate, substantially as described.

2. In the production of carbonic-acid gas, the process of feeding a dry carbonate at will from an independent source continuously into the generating-chamber, against the pressure of the gas, by equalizing the pressure upon the upper and lower surfaces of the dry carbonate, substantially as set forth.

3. The hopper H, provided with the partition H', substantially as and for the purpose set forth.

4. A feeding device consisting of a wheel having two or more boxes, open at the bottom, and leaving spaces between them, substantially as described.

5. The combination of the feed-wheel C in the chamber B with the partition I, having opening J, as set forth.

6. The chamber B, provided with a bulge or additional chamber, $b$, above the opening J, to contain gas and equalize the pressure upon the contents of the compartments C' of the feed-wheel, as described.

7. The combination of the hopper H, partitioned, as described, the feeding device in the chamber B, and the chamber A, substantially as and for the purpose specified.

8. The combination of the partitioned hopper H, the feeding device in chamber B, the chamber A, having stirrer K, and an acid-chamber, suitably connected to the chamber A, substantially as described.

In testimony that I claim the foregoing as my own I have affixed my signature in presence of two witnesses.

CHARLES H. THOMPSON.

Witnesses:
ROBT. H. KEECH,
E. RÉPIQUET.